(12) United States Patent
Okuzono et al.

(10) Patent No.: US 8,527,799 B2
(45) Date of Patent: *Sep. 3, 2013

(54) INFORMATION PROCESSING APPARATUS CAPABLE OF BEING INSTRUCTED TO POWER OFF BY A COMMAND FROM EXTERNAL APPARATUS, METHOD OF CONTROLLING THE SAME, AND STORAGE MEDIUM

(75) Inventors: Ryotaro Okuzono, Kawasaki (JP); Tomohiro Akiba, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,132

(22) Filed: Sep. 14, 2012

(65) Prior Publication Data
US 2013/0013939 A1    Jan. 10, 2013

Related U.S. Application Data

(63) Continuation of application No. 12/814,925, filed on Jun. 14, 2010, now Pat. No. 8,296,594.

(30) Foreign Application Priority Data
Jun. 19, 2009 (JP) ................................. 2009-146474

(51) Int. Cl.
*G06F 1/00* (2006.01)
*G06F 15/177* (2006.01)
*B23K 11/24* (2006.01)

(52) U.S. Cl.
USPC ........... 713/324; 713/300; 713/310; 323/318; 709/222

(58) Field of Classification Search
USPC .......... 713/300, 310, 324; 323/318; 709/222
See application file for complete search history.

(56) References Cited

U.S. PATENT DOCUMENTS

| 5,815,409 A | 9/1998 | Lee et al. |
| 6,098,174 A * | 8/2000 | Baron et al. .................. 713/300 |
| 6,968,466 B2 | 11/2005 | Bolian et al. |
| 7,173,613 B2 * | 2/2007 | Greenwood et al. .......... 345/211 |
| 7,240,222 B1 * | 7/2007 | Falik et al. .................... 713/300 |
| 7,987,377 B2 | 7/2011 | Fu |
| 2010/0194358 A1 | 8/2010 | Stanford-Clark |

FOREIGN PATENT DOCUMENTS

| JP | 03-252714 A | 11/1991 |
| JP | 09-258857 A | 10/1997 |
| JP | 2002-073220 A | 3/2002 |

OTHER PUBLICATIONS

JP OA issued Apr. 23, 2013 for corres. JP 2009-146474.

* cited by examiner

*Primary Examiner* — Stefan Stoynov
(74) *Attorney, Agent, or Firm* — Rossi, Kimms & McDowell LLP

(57) ABSTRACT

An image processing apparatus that is capable of being instructed to power off, by a power switch or a command from an external apparatus, and is capable of executing the restart thereof under appropriate conditions. When power-off is instructed, shutdown is started. Upon completion of the shutdown, if the power switch is on, and at the same time the power-off has been instructed by the power switch of the apparatus, the restart of the apparatus is executed, whereas upon completion of the shutdown, if the power-off has been instructed by a command from the external apparatus, the restart of the apparatus is not executed.

7 Claims, 5 Drawing Sheets

INFORMATION PROCESSING APPARATUS CAPABLE OF BEING INSTRUCTED TO POWER OFF BY A COMMAND FROM EXTERNAL APPARATUS, METHOD OF CONTROLLING THE SAME, AND STORAGE MEDIUM

This is a continuation of and claims benefit to U.S. patent application Ser. No. 12/814,925, filed Jun. 14, 2010, that issued as U.S. Pat. No. 8,296,594, the content of which is incorporated herein by reference. These applications claim priority to JP Application No. 2009-146474, filed Jun. 19, 2009.

BACKGROUND OF THE INVENTION

1. Field of the Invention

The present invention relates to an information processing apparatus that is capable of being instructed to power off by a command from an external apparatus, and a method of controlling the same.

2. Description of the Related Art

Some information processing apparatuses execute shutdown thereof upon turn-off of a power switch thereof, to thereby stop supply of electric power thereto.

Japanese Patent Laid-Open Publication No. 2002-073220 discloses a shutdown control method of starting shutdown upon turn-off of a power switch, and checking a state of the power switch upon completion of the shutdown process. In the shutdown control method disclosed in Japanese Patent Laid-Open Publication No. 2002-073220, as a result of the check, if the power switch is off, the supply of electric power to the information processing apparatus is stopped, whereas if the power switch is on, the restart of the information processing apparatus is executed.

On the other hand, there has been disclosed a technique for turning off the power of the information processing apparatus by a command from an external apparatus connected thereto e.g. via a network.

However, when the above-mentioned technique is applied to the shutdown control method disclosed in Japanese Patent Laid-Open Publication No. 2002-073220, the following problem occurs: When the power of the information processing apparatus is turned off by a command from the external apparatus, since the power switch remains on, the restart of the information processing apparatus is executed against an operator's will.

SUMMARY OF THE INVENTION

The present invention provides an image processing apparatus that is capable of being instructed to power off by a power switch or a command from an external apparatus and is capable of executing the restart thereof under appropriate conditions.

In a first aspect of the present invention, there is provided an information processing apparatus connected to an external apparatus, comprising a power switch adapted to turn on or off power of the information processing apparatus, a reception unit adapted to receive a command for turning off the power of the information processing apparatus from the external apparatus, an execution unit adapted to execute shutdown of the information processing apparatus when turn-off of the power of the information processing apparatus has been instructed by the power switch or by the command received by the reception unit, a first determination unit adapted to determine whether the power switch is on or off, a second determination unit adapted to determine whether the turn-off of the power of the information processing apparatus has been instructed by the power switch or by the command received by the reception unit, and a control unit adapted to be operable upon completion of the shutdown by the execution unit, to control the information processing apparatus such that the information processing apparatus is restarted, when the first determination unit determines that the power switch is on, and at the same time when the second determination unit determines that the turn-off of the power of the information processing apparatus has been instructed by the power switch, and to control the information processing apparatus such that the information processing apparatus is not restarted, when the second determination unit determines that the turn-off of the power of the information processing apparatus has been instructed by the command received by the reception unit.

In a second aspect of the present invention, there is provided a method of controlling an information processing apparatus connected to an external apparatus, the information processing apparatus including a power switch adapted to turn on or off power of the information processing apparatus, and a reception unit adapted to receive a command for turning off the power of the information processing apparatus from the external apparatus, the method comprising executing shutdown of the information processing apparatus when turn-off of the power of the information processing apparatus has been instructed by the power switch or by the command received by the reception unit, determining whether the power switch is on or off, determining whether the turn-off of the power of the information processing apparatus has been instructed by the power switch or by the command received by the reception unit, and upon completion of the shutdown, controlling the information processing apparatus such that the information processing apparatus is restarted, when it is determined that the power switch is on, and at the same time when it is determined that the turn-off of the power of the information processing apparatus has been instructed by the power switch, and controlling the information processing apparatus such that the information processing apparatus is not restarted, when it is determined that the turn-off of the power of the information processing apparatus has been instructed by the command received by the reception unit.

In a third aspect of the present invention, there is provided a non-transitory computer-readable storage medium storing a computer-executable program for implementing a method of controlling an information processing apparatus connected to an external apparatus, the information processing apparatus including a power switch adapted to turn on or off power of the information processing apparatus, and a reception unit adapted to receive a command for turning off the power of the information processing apparatus from the external apparatus, wherein the method comprises executing shutdown of the information processing apparatus when turn-off of the power of the information processing apparatus has been instructed by the power switch or by the command received by the reception unit, determining whether the power switch is on or off, determining whether the turn-off of the power of the information processing apparatus has been instructed by the power switch or by the command received by the reception unit, and upon completion of the shutdown, controlling the information processing apparatus such that the information processing apparatus is restarted, when it is determined that the power switch is on, and at the same time when it is determined that the turn-off of the power of the information processing apparatus has been instructed by the power switch, and controlling the information processing apparatus such that the information processing apparatus is not restarted, when it is determined that the turn-off of the power of the information processing apparatus has been instructed by the command received by the reception unit.

According to the present invention, it is possible to restart the information processing apparatus which is capable of being instructed to power off by a power switch or a command from an external apparatus, under appropriate conditions.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

The following description will be given by taking a printer as an example of an information processing apparatus according to an embodiment of the present invention, and a PC as an example of an external apparatus, but the information processing apparatus and the external apparatus are by no means limited to these examples.

Further, in the following description, a term "power-off processing" is intended to mean processing for turning off the power of the apparatus, and is assumed to include shutdown of the apparatus and stoppage of the supply of electric power to the apparatus.

Further, in the following description, the term "shutdown" is intended to mean execution of a series of processing operations including closing of files, termination of application programs, disconnection of communication with input/output apparatuses, and termination of an operating system (OS).

Further, in the following description, the term "restart" is intended to mean execution of a series of processing operations including starting a basic input output system (BIOS) and the OS, after completion of the shutdown.

Figure 1:
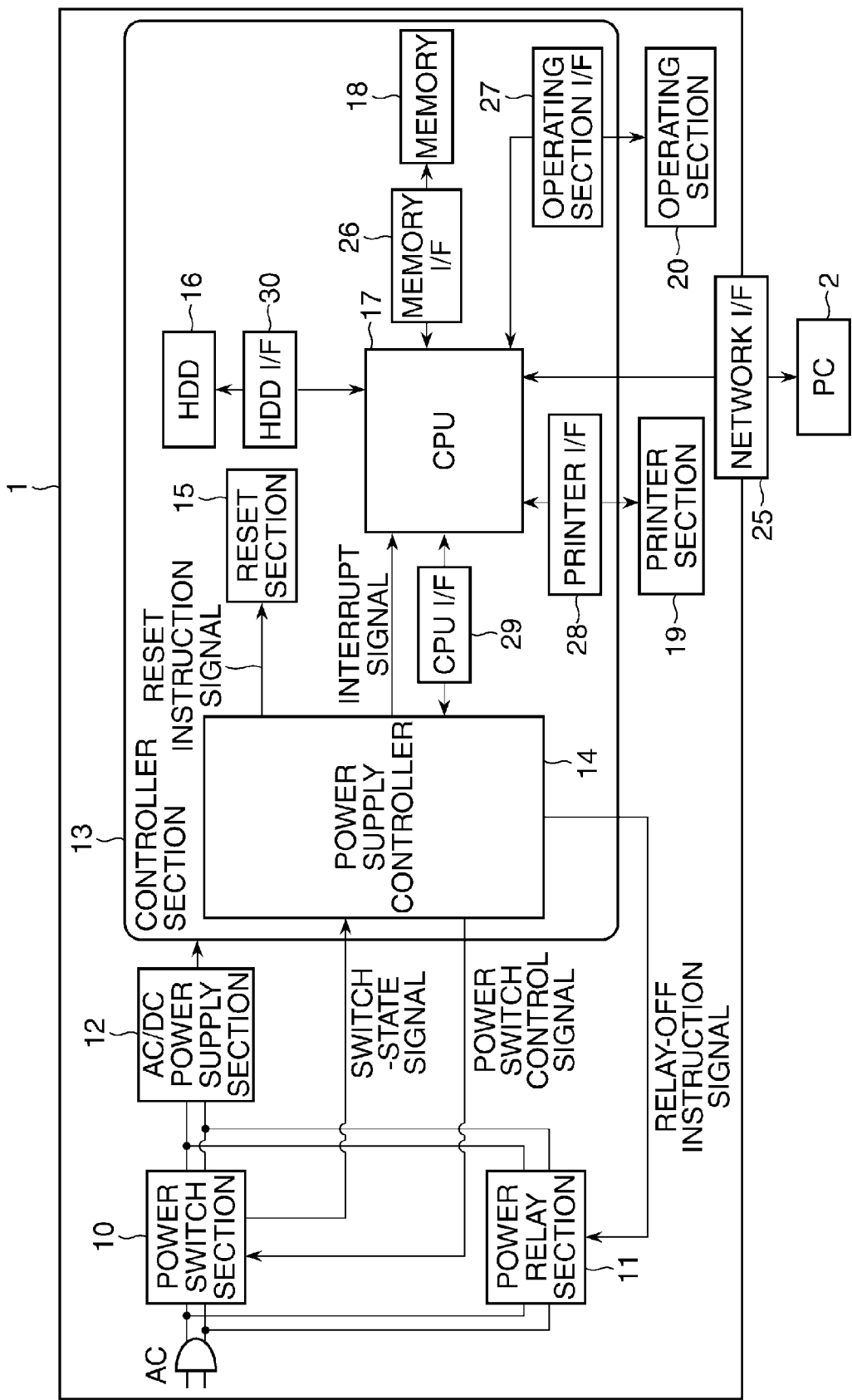
FIG. 1 is a block diagram of a printer.

FIG. 1 is a block diagram of the printer as the information processing apparatus according to the present embodiment.

The printer 1 is communicably connected to the PC 2 over a network via a network interface 25. The printer 1 is capable of receiving a command for turning off the power of the printer 1 from the PC 2.

The printer 1 comprises a power switch section 10, a power relay section 11, an AC/DC power supply section 12, a controller section 13, and a printer section 19.

The power switch section 10 includes a power switch 101 (see FIG. 2) for instructing to turn on or off the supply of electric power from an alternating current (AC) power supply. This power switch 101 is a solenoid switch. The solenoid switch is formed by a switch and an actuator, neither of which is shown. The switch is configured such that it can be manually or automatically turned on and off. The actuator is formed by a solenoid and an iron core (disposed in the solenoid), neither of which is shown, and is capable of automatically turning on and off the switch by causing electric current to flow through the solenoid to thereby cause the iron core to operate. Further, the power switch section 10 has the function of notifying a power supply controller 14 of the on/off state of the power switch 101.

The power relay section 11 is provided for supplying external AC power to the AC/DC power supply section 12 according to a signal from the power supply controller 14 even when the power switch 101 is off.

The AC/DC power supply section 12 converts the externally-supplied AC power into DC power so as to supply the DC power to devices, such as the controller section 13 and the printer section 19.

The controller section 13 includes the power supply controller 14, a reset section 15, a HDD (Hard Disk Drive) 16, a CPU (Central Processing Unit) 17, and a memory 18.

The power supply controller 14 connected to the CPU 17 via a CPU interface 29 detects the on/off state of the power switch 101, and delivers instruction signals for instructing processing, such as power-on processing, reset processing, and the power-off processing.

The reset section 15 performs the reset processing of the whole hardware of the controller section 13 according to a reset instruction signal from the power supply controller 14 e.g. when the computer system is restarted.

The HDD 16 connected to the CPU 17 via a HDD interface 30 stores various software and data executed by the computer system. Further, the HDD 16 stores the OS, various application programs (control programs) for carrying out information processing specific to the apparatus, and the like. The control programs include a control program associated with the power-off processing.

The CPU 17 executes the power-off processing, the reset processing, and the like, based on the signals from the power supply controller 14, and controls the overall operation of the system concerning the printer 1.

The memory 18 connected to the CPU 17 via a memory interface 26 is formed by a volatile memory, such as a DDR SDRAM (Double-Data-Rate Synchronous Dynamic Random Access Memory), and is used e.g. as a work area of the CPU 17.

The printer section 19 connected to the CPU 17 via a printer interface 28 executes print processing under the control of the CPU 17.

An operating section 20 connected to the CPU 17 via an operating section interface 27 includes a display screen and an input button, and accepts various operations from an operator.

Figure 2:
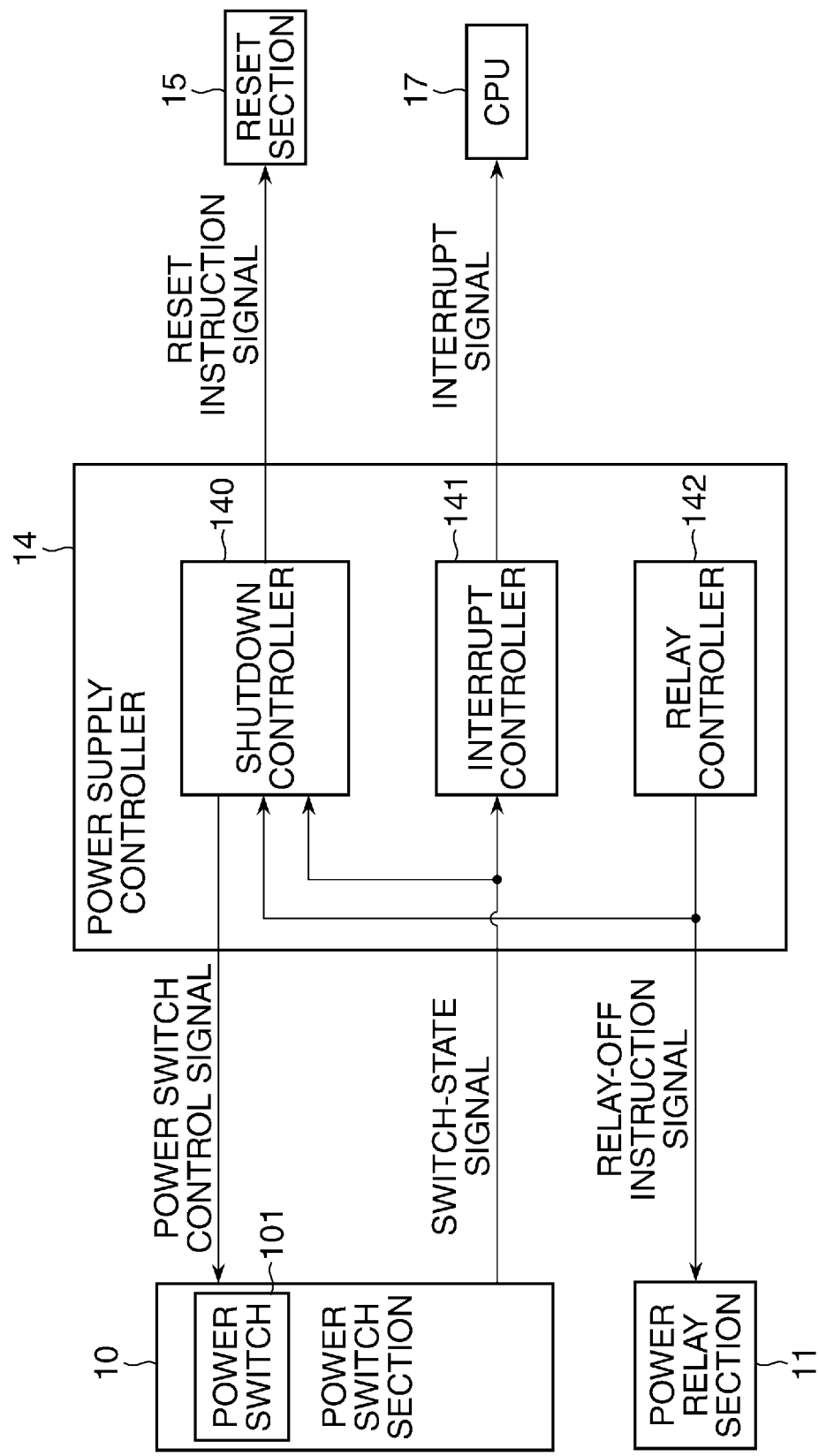
FIG. 2 is a block diagram of a power supply controller.

FIG. 2 is a block diagram of the power supply controller 14.

The power supply controller 14 includes a shutdown controller 140, an interrupt controller 141, and a relay controller 142.

The shutdown controller 140 receives a switch-state signal (signal indicative of the on/off state of the power switch 101) from the power switch section 10 including the power switch 101, and a relay-off instruction signal from the relay controller 142. Then, when the shutdown controller 140 determines based on the switch-state signal and the relay-off instruction signal that a power-off instruction operation has been performed by a remote operation, the shutdown controller 140 delivers a power switch control signal for causing the power switch section 10 to perform the power-off processing, to the power switch section 10. Further, when the switch-state signal changes from the on state to the off state, and then changes to the on state again, the shutdown controller 140 delivers the reset instruction signal to the reset section 15 to reset the hardware. This enables the CPU 17 to restart the computer system in a state where the hardware thereof is reset.

The interrupt controller 141 receives the switch-state signal indicative of the on/off state of the power switch 101 from the power switch section 10, to thereby monitor the on/off state of the power switch 101. When the power switch 101 changes from the on state to the off state, the interrupt controller 141 asserts an interrupt signal to the CPU 17 to thereby notify the CPU 17 that the power switch 101 has been turned off.

The relay controller 142 delivers the relay-off instruction signal to the power relay section 11 in response to an instruction signal from the CPU 17.

Figure 3:
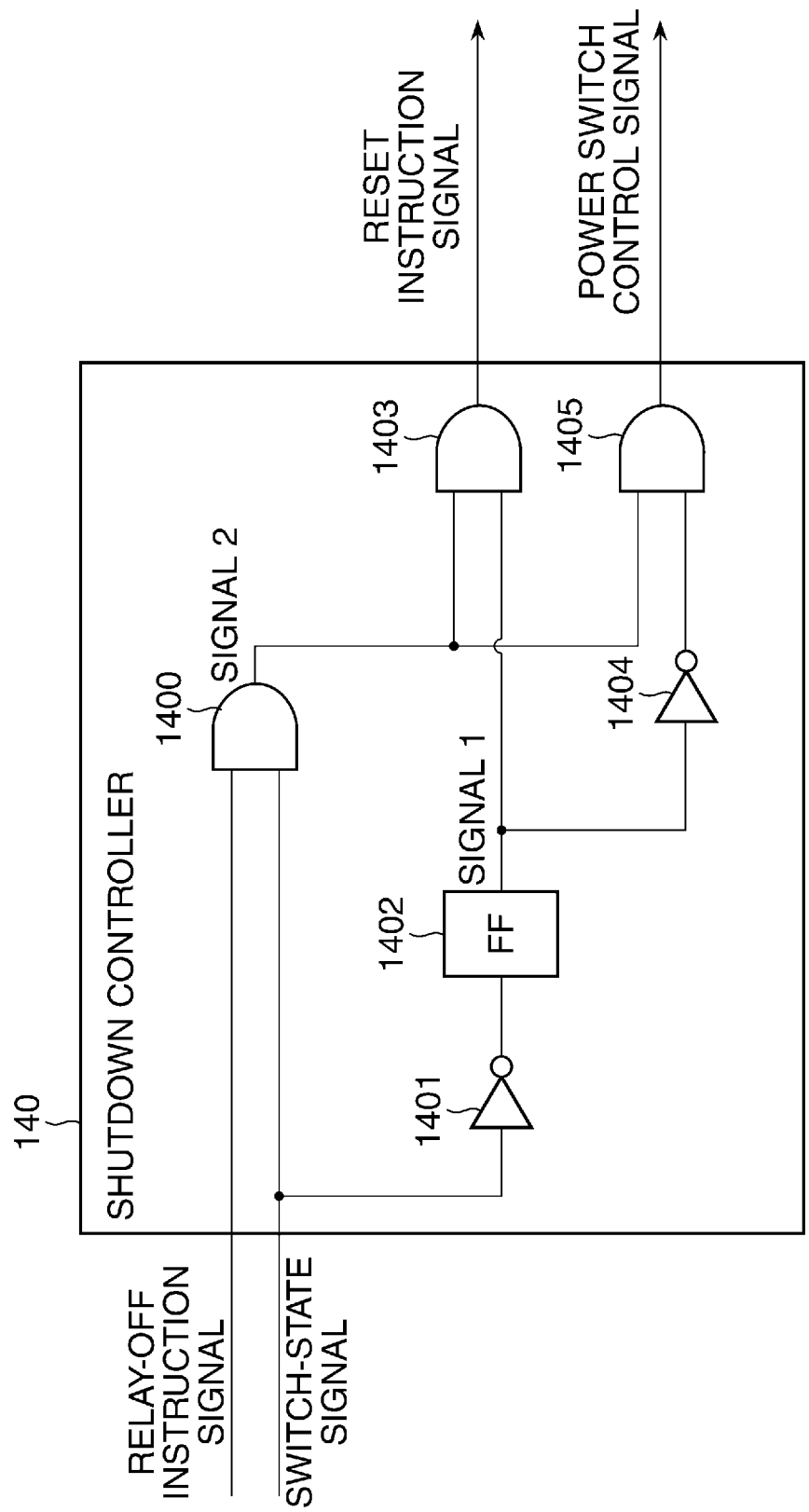
FIG. 3 is a block diagram of a shutdown controller.

FIG. 3 is a block diagram of the internal configuration of the shutdown controller 140.

The shutdown controller 140 includes AND circuits 1400, 1403, and 1405, NOT circuits 1401 and 1404, and a flip-flop (FF) circuit 1402.

The AND circuit 1400 delivers a logical product of the relay-off instruction signal and the switch-state signal to the AND circuits 1403 and 1405 as a signal 2.

The NOT circuit 1401 inverts the switch-state signal, and inputs the same to the flip-flop circuit 1402.

The flip-flop circuit 1402 holds a state of change in the switch-state signal switched between on and off, and outputs the state to the AND circuits 1403 and 1405 as a signal 1. To the AND circuit 1405, the signal 1 is delivered via the NOT circuit 1404.

The AND circuit 1403 delivers as an output a reset instruction signal to the reset section 15. Further, the AND circuit 1405 delivers as an output a power switch control signal to the power switch section 10.

With the arrangement shown in FIGS. 1 to 3, the power supply controller 14 performs the power-off processing. The above-mentioned signals are output from the component circuits of the shutdown controller 140 of the power supply controller 14, as shown in the following timing diagrams in FIGS. 4 to 6.

Figure 4:
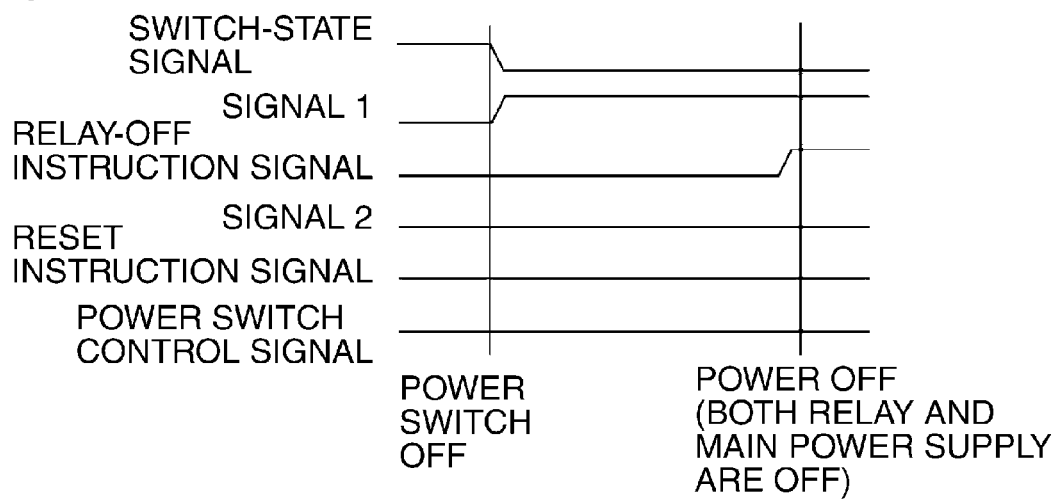
FIG. 4 is a timing diagram showing states of control signals during power-off processing in a case where a power switch is turned off but is not turned on again.

FIG. 4 is a timing diagram showing the states of the control signals during the power-off processing executed in the present embodiment in a case where the power switch 101 is turned off but is not turned on again.

Here, during normal operation, the relay controller 142 sets the relay-off instruction signal to a low level to set the power relay section 11 to the on state so as to enable AC power to be supplied to the AC/DC power supply section 12 even when the power switch 101 is turned off against a user's will.

The interrupt controller 141 monitors the state of change between on and off of the switch-state signal output from the power switch section 10.

When the switch-state signal changes from on (high level) to off (low level), the interrupt controller 141 asserts the interrupt signal to the CPU 17 to thereby notify the CPU 17 that the power switch 101 has been turned off.

Further, when the switch-state signal changes from on to off, as shown in FIG. 4, the signal 1 output from the flip-flop circuit 1402 changes to the high level.

When the interrupt signal is asserted, the CPU 17 executes software for shutdown.

When the shutdown of the HDD 16 etc. is completed, the CPU 17 notifies the relay controller 142 of the completion of the shutdown.

Upon receipt of the notification of the completion of the shutdown, as shown in FIG. 4, the relay controller 142 changes the relay-off instruction signal to the high level to set the power relay section 11 to the off state.

It should be noted, as shown in FIG. 4, when the switch-state signal of the power switch 101 only changes from on to off, the signal 2 output from the AND circuit 1400, the reset instruction signal output from the AND circuit 1403, and the power switch control signal output from the AND circuit 1405 remains at the low level without being changed.

After the shutdown is started by the above-described sequence of changes in the control signals and is then completed, the power switch 101 of the power switch section 10 and the power relay section 11 are both turned off, whereby the power-off is completed.

Figure 5:
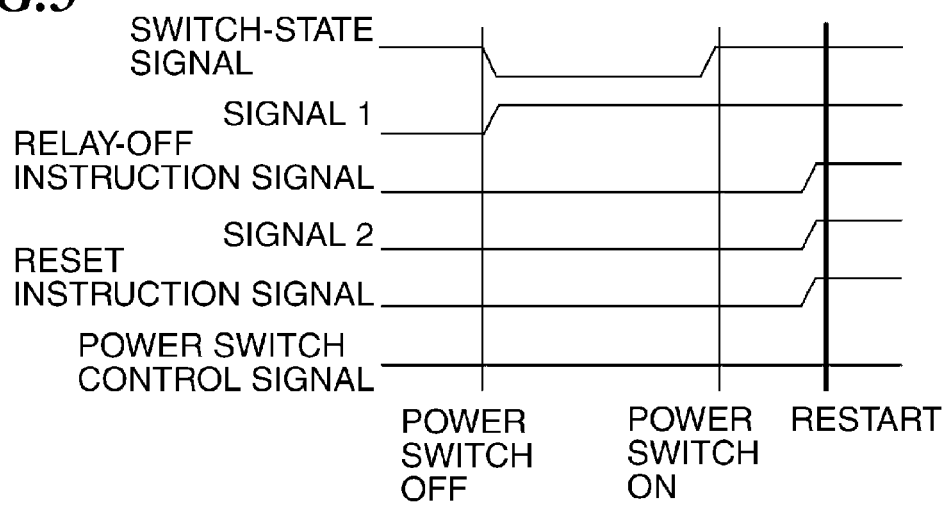
FIG. 5 is a timing diagram showing states of the control signals during the power-off processing in a case where the power switch is turned off and is then turned on again.

FIG. 5 is a timing diagram showing states of the control signals during the power-off processing executed in the present embodiment in a case where the power switch 101 is turned on again after being turned off.

As described above, when the power switch 101 is turned off, the CPU 17 starts shutdown by software.

When the power switch 101 is turned off, as shown in FIG. 5, the signal 1 output from the flip-flop circuit 1402 changes to the high level.

When the state of the power switch 101 changes from off to on before completion of the shutdown process or before the relay controller 142 sets the power relay section 11 to the off state after completion of the shutdown process, i.e. when the user instructs to restart the computer system, the relay-off instruction signal and the switch-state signal both change to the high level.

This causes the signal 2 delivered from the AND circuit 1400 to change from the low level to the high level.

Further, since the signal 1 and the signal 2 change to the high level, the reset instruction signal output from the AND circuit 1403 changes from the low level to the high level.

When the reset instruction signal changes to the high level, the reset section 15 asserts a hardware reset line for a required time period, to thereby reset the CPU 17 and peripheral hardware of the CPU 17.

Then, the CPU 17 restarts the system based on predetermined software for restart.

Figure 6:
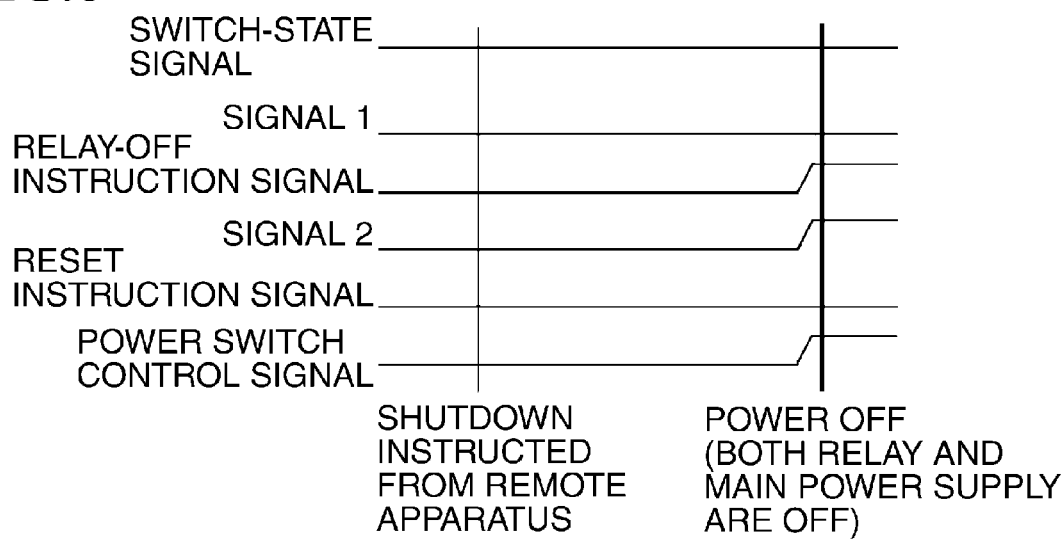
FIG. 6 is a timing diagram showing states of the control signals during the power-off processing in a case where power-off is instructed by a remote operation.

FIG. 6 is a timing diagram showing states of the control signals during the power-off processing executed in the present embodiment in a case where power-off is instructed by a remote operation.

An operation signal for switching off the power is directly input by a remote operation from the PC 2 to the CPU 17 via the network interface 25 connected to the CPU 17.

When the operation signal for switching off the power is input by a remote operation from the PC 2, the CPU 17 executes the shutdown software.

In this case, as shown in FIG. 6, the power switch 101 is held in the on state without being changed so that the switch-state signal remains at the high level, and hence the signal 1 output from the flip-flop circuit 1402 remains at the low-level.

Immediately before the relay controller 142 sets the power relay section 11 to the off state after completion of the shutdown process, the power switch 101 is in the on state, so that as shown in FIG. 6, the relay-off instruction signal and the switch-state signal are both at the high level.

This causes the signal 2 output from the AND circuit 1400 to change to the high level.

Further, the signal 1 is logically inverted by the NOT circuit 1404 into the high level, and the signal 2 as well has changed to the high level as mentioned above, so that as shown in FIG. 6, the power switch control signal output from the AND circuit 1405 changes to the high level.

When the power switch control signal changes to the high level, the power switch section 10 sets the power switch 101 implemented by the solenoid switch to the off state.

The above-described sequence of processing causes both the power switch section 10 and the power relay section 11 to change to the off state, whereby the power-off of the printer 1 is completed.

Next, a variation of the present embodiment in which the functions of the shutdown controller 140 for executing the above-described processing for delivering the reset instruction signal and the power switch control signal are realized by software for executing a power-off control process, without using the above-described logic circuit shown in FIG. 3.

Figure 7:
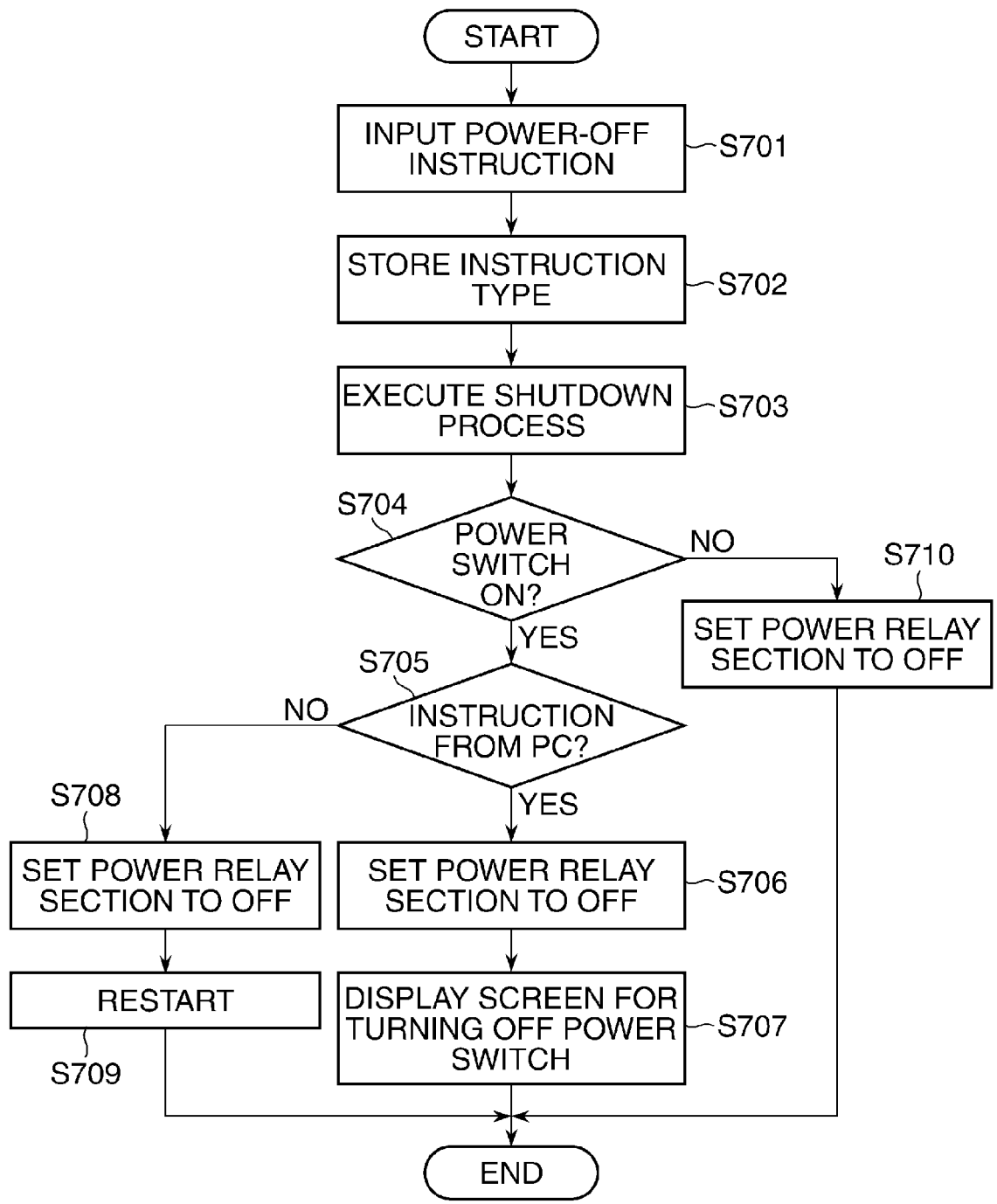
FIG. 7 is a flowchart of a power-off control process executed based by software in a variation of the present embodiment.

FIG. 7 is a flowchart of the power-off control process executed by the software by the CPU 17 in the variation of the present embodiment.

First, the CPU 17 receives an interrupt signal from the interrupt controller 141 when the power switch 101 is turned off, or receives a power-off instruction signal transmitted from the PC 2 by a remote operation, whereby a power-off instruction is input thereto (step S701).

Next, the CPU 17 stores information indicative of the above (information indicative of whether the power-off instruction received in the step S701 has been given by the power switch 101 of the printer or by a power-off command from the PC) (step S702).

Next, the CPU 17 executes the shutdown of the printer 1 by software (step S703). When the shutdown is completed in the step S703, the process proceeds to a step S704.

Next, the CPU 17 checks the state of the power switch 101 of the power switch section 10 to determine whether the power switch 101 is on or off (first determination) (step S704). The case where it is determined in the step S704 that the power switch 101 is on corresponds e.g. to a case where the power switch 101 is directly turned on after being directly turned off, or a case where the power-off is instructed by a command from the external apparatus. Further, the case where it is determined in the step S704 that the power switch 101 is off corresponds e.g. to a case where the power switch 101 is not directly turned on after being directly turned off. If it is determined in the step S704 that the power switch 101 is on, the process proceeds to a step S705. If it is determined in the step S704 that the power switch 101 is off, the process proceeds to a step S710.

If it is determined in the step S704 that the power switch 101 is on, the CPU 17 performs the following processing:

First, the CPU 17 determines based on the information stored in the step S702 whether the power-off instruction input in the step S701 has been given by the power switch 101 of the printer 1 or by the power-off command from the PC (second determination) (step S705). If it is determined in the step S705 that the power-off instruction input in the step S701 has been given by the power-off command from the PC 2, the process proceeds to a step S706. If it is determined in the step S705 that the power-off instruction input in the step S701 has been given by the power switch 101 of the printer 1, the process proceeds to a step S708.

If it is determined in the step S705 that the power-off instruction input in the step S701 has been given by the power-off command from the PC 2, the CPU 17 executes the following processing:

First, the CPU 17 sets the power relay section 11 to the off state via the relay controller 142 (step S706).

Next, the CPU 17 displays a message for prompting the operator to turn off the power switch 101, on the display screen, not shown, of the operating section 20, and waits for the operator of the printer 1 to turn off the power switch 101 of the power switch section 10 (step S707). As the prompting message, there may be displayed a message saying that e.g. "Shutdown has been completed. Please turn off the power switch 101". This makes it unnecessary for the operator to wait for completion of the shutdown process in front of the printer after the operator gives a power-off instruction by directly turning off the power switch 101.

In the step S707, the power switch 101 of the power switch section 10 may be automatically turned off instead of displaying the message and waiting for the operator to turn off the power switch 101. In this case, the power switch 101 may be forcibly turned off e.g. by applying voltage to the actuator of the power switch 101. This makes it unnecessary for the operator to go to the printer so as to turn off the power supply of the printer.

Thus, since the power relay section 11 and the power switch 101 are turned off, the supply of electric power to the printer 1 is stopped.

If it is determined in the step S705 that the power-off instruction input in the step S701 has been given by the power switch 101 of the printer 1, the CPU 17 executes the following processing:

First, the CPU 17 sets the power relay section 11 to the off state via the relay controller 142 (step S708). At this time, the power switch 101 is in the on state, so that even when the power relay section 11 is turned off, the supply of electric power to the printer 1 is continued. Further, if processing for turning on the power relay section 11 is not included in processing executed in a step S709, referred to hereinafter, for restarting the system, the step S708 may be omitted (the power relay section 11 may be held in the on state).

Next, the CPU 17 restarts the system (step S709). It is assumed in the present example that the process for turning on the power relay section 11 is included in the processing for restarting the system.

Thus, the apparatus is restarted to continue supplying electric power to the printer 1.

If it is determined in the step S704 that the power switch 101 is off, the CPU 17 executes the following processing:

First, the CPU 17 sets the power relay section 11 to the off state via the relay controller 142 (step S710).

This places both the power relay section 11 and the power switch 101 in the off state, and hence the supply of electric power to the printer 1 is stopped.

According to the present embodiment, it is possible to execute the restart of a printer which is capable of being instructed to power off by a power switch or a command from a PC, under appropriate conditions.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-146474, filed Jun. 19, 2009, which is hereby incorporated by reference herein in its entirety.

What is claimed is:

1. An information processing apparatus which is able to communicate with an external apparatus, comprising:
 a power switch adapted to turn on or off power of the information processing apparatus;
 a reception unit adapted to receive a command for turning off the power of the information processing apparatus from the external apparatus;
 an execution unit adapted to execute shutdown of the information processing apparatus in response to turning off of the power switch or receiving of the command from the external apparatus; and
 a control unit adapted to control, in case that the execution unit executes shutdown of the information processing apparatus in response to turning off of the power switch, to restart the information processing apparatus when the power switch is on at completion of the shutdown of the information processing apparatus, and to turn off the power of the information processing apparatus when the power switch is off at completion of the shutdown of the information processing apparatus, and, in case that the execution unit executes shutdown of the information processing apparatus in response to receiving of the command from the external apparatus, to turn off the power of the information processing apparatus regardless of a state of the power switch at completion of the shutdown of the information processing apparatus.

2. The information processing apparatus according to claim 1, wherein the control unit is adapted to turn off the power switch automatically, in case that the execution unit executes shutdown of the information processing apparatus in response to receiving of the command from the external apparatus.

3. The information processing apparatus according to claim 1, wherein the control unit is adapted to prompt a user to turn off the power switch, in case that the execution unit executes shutdown of the information processing apparatus in response to receiving of the command from the external apparatus.

4. The information processing apparatus according to claim 1, wherein the shutdown includes at least one of processing operations including closing of files, termination of application programs, disconnection of communication with input/output apparatuses, and termination of an operating system (OS).

5. The information processing apparatus according to claim 1 further comprising a print unit adapted to perform printing.

6. A method for controlling an information processing apparatus connectable to an external apparatus, the information processing apparatus including a power switch for turning on or off power of the information processing apparatus, the method comprising:
 receiving a command for turning off the power of the information processing apparatus from the external apparatus;
 executing shutdown of the information processing apparatus in response to turning off of the power switch or receiving of the command from the external apparatus; and
 controlling, in case that the execution unit executes shutdown of the information processing apparatus in response to turning off of the power switch, to restart the information processing apparatus when the power switch is on at completion of the shutdown of the information processing apparatus, and to turn off the power of the information processing apparatus when the power switch is off at completion of the shutdown of the information processing apparatus, and, in case that the execution unit executes shutdown of the information processing apparatus in response to receiving of the command from the external apparatus, to turn off the power of the information processing apparatus regardless of a state of the power switch at completion of the shutdown of the information processing apparatus.

7. A non-transitory computer-readable storage medium having stored therein a program for causing a computer to implement a method for controlling an information processing apparatus connectable to an external apparatus, the information processing apparatus including a power switch for turning on or off power of the information processing apparatus,
 the method comprising:
 receiving a command for turning off the power of the information processing apparatus from the external apparatus;
 executing shutdown of the information processing apparatus in response to turning off of the power switch or receiving of the command from the external apparatus; and
 controlling, in case that the execution unit executes shutdown of the information processing apparatus in response to turning off of the power switch, to restart the information processing apparatus when the power switch is on at completion of the shutdown of the information processing apparatus, and to turn off the power of the information processing apparatus when the power switch is off at completion of the shutdown of the information processing apparatus, and, in case that the execution unit executes shutdown of the information processing apparatus in response to receiving of the command from the external apparatus, to turn off the power of the information processing apparatus regardless of a state of the power switch at completion of the shutdown of the information processing apparatus.

* * * * *